UNITED STATES PATENT OFFICE.

MARTIN S. KENNEY AND JOSEPH C. HOLZHAUSER, OF NEW ORLEANS, LOUISIANA.

MATERIAL FOR USE IN MAKING A BEVERAGE AND PROCESS OF MAKING SAID MATERIAL.

1,117,855.   Specification of Letters Patent.   Patented Nov. 17, 1914.

No Drawing.   Application filed January 28, 1914.   Serial No. 815,049.

*To all whom it may concern:*

Be it known that we, MARTIN S. KENNEY and JOSEPH C. HOLZHAUSER, citizens of the United States, residing at New Orleans, in the parish of Orleans and State of Louisiana, have invented new and useful Improvements in Material for Use in Making a Beverage and Process of Making Said Material, of which the following is a specification.

This invention relates to the production of a material which will be used as a substitute for coffee, or may be used as a blending agent, in order to produce a coffee mixture having certain desired flavor.

The coffee substitute produced in accordance with this invention is wholly free from poisonous alkaloids such as caffein and the like, and also has a certain food value in which respects it differs from real coffee, although it has a flavor and color resembling roasted coffee beans.

In preparing our mixture we preferably proceed as follows (the proportions being given by volume):

1 part of wheat flour is added to 1 part of pure water, and the mixture is boiled, or maintained at about the boiling point of water, for several hours, until a stiff paste is produced, to which paste is then added 5 parts (more or less) of rice flour or rice polish, the mixture is thoroughly kneaded and is molded into shapes to meet the requirements of the trade, the shape of the ordinary coffee bean being ordinarily preferred, although the pieces may be made round, half round, oval, half oval, square or irregular shape, or of any other desired shape, after which the pieces are passed through a drying cylinder, in order to drive off substantially all of the water which has been added and to leave hard masses, which more or less resemble unroasted coffee beans in size and shape. During the stage of mixing or kneading or at any other desired stage of the operation, we may add suitable materials to produce any desired special flavor, although this step is optional. The proportions above stated are by volume, and these proportions need not be absolutely adhered to, and owing to the fluctuation in the quality of wheat flour and rice flour, if a standard product is to be made the proportions must be more or less altered, with each successive batch of materials employed in order to make up for the existing differences in the materials. The beans or other shaped pieces, are then roasted in the ordinary manner, as well understood by coffee roasters, until the desired flavor and desired color are produced, and may then be either sold as coffee substitute, or may be mixed with any desired proportions of roasted coffee.

A particular feature of the invention resides in the fact that the coffee beans are preferably of substantially the same specific gravity, as the roasted coffee with which they have to be mixed, and the specific gravity of the roasted beans is adjusted by the use of greater or less pressure in the step of molding. It is obvious that this is a valuable feature, since materials will tend to separate during shipment, if said materials are of materially different specific gravities, and this is especially true of ground coffee.

The specific gravity of the product may also be varied more or less by the increasing or decreasing the time of cooking the paste of flour and water, and may also be varied more or less by increasing or decreasing the proportion of wheat flour to rice flour.

Obviously the beans as produced in the coffee roaster may be sold as such, or after the usual grinding operation, or if desired the grinding operation may be dispensed with by producing molded pieces having substantially the size of ground coffee, before roasting.

The molding operation may if desired be facilitated by the use of a centrifugal force although this is optional.

It will be noted that the use of a relatively small amount of water as above referred to is a material advantage, since it avoids the necessity of evaporating a large quantity of water.

The cooking of the wheat flour is a material advantage in the process, since it disrupts the starch granules therein, also renders the proteids more digestible and furnishes a suitable adhesive for binding together the particles of the rice polish in a manner well understood by those familiar with the art.

Rice polish as herein referred to, is a waste material resulting from the attrition of rice kernels in polishing rice, and constitutes a more or less impure rice flour. The use of rice polish containing considerable amounts of insoluble mineral substances, such as would be produced by the attention of rice kernels with pieces of comparatively soft mineral matter such as talc, is objectionable.

What we claim is:—

1. A process of making a material suitable for use in preparing a beverage, which comprises cooking a mixture of wheat flour and water, adding rice polish to form a paste, then forming said paste into pieces of the desired shape and size, drying the pieces thereby produced and roasting the same at a suitable temperature to produce the color and flavor desired.

2. A process of making a material suitable for use in preparing a beverage which comprises cooking together (by volume), one part of wheat flour and one part of water, then adding five parts of rice polish, and any desired flavoring material, mixing the mass thoroughly to form a stiff paste, molding into pieces of about the size and shape of a coffee bean, drying the pieces, and then roasting the same at a temperature sufficiently high to produce the desired color and flavor.

3. A material suitable for use in preparing a beverage comprising cooked wheat flour and rice flour, having substantially the size and shape of coffee beans, and roasted to a coffee color, substantially as described.

4. A cooked material suitable for use in preparing a beverage, said material containing rice polish, said material having substantially the size, shape and color of roasted coffee beans.

In testimony whereof we affix our signatures in presence of two witnesses.

MARTIN S. KENNEY.
JOSEPH C. HOLZHAUSER.

Witnesses:
M. D. CONNERS,
G. SCHMITT.

Copies of this patent may be obtained for five cents each, by addressing the "Commissioner of Patents, Washington, D. C."